United States Patent

[11] 3,612,549

[72] Inventor Melvin H. Berkowitz
       53 Sheldon Road, Newton, Mass. 02159
[21] Appl. No. 40,155
[22] Filed May 25, 1970
[45] Patented Oct. 12, 1971

[54] PRESSURE SEAL
     5 Claims, 1 Drawing Fig.
[52] U.S. Cl. .................................................. 277/80,
                                                          277/90
[51] Int. Cl. ..................................................... F16j 9/00,
                                                          E21b 33/00
[50] Field of Search ............................................ 277/80, 90

[56]              References Cited
              UNITED STATES PATENTS
2,974,981  3/1961  Vervest ...................... 277/80
2,834,618  5/1958  Wiltse ........................ 277/80 UX
3,137,237  6/1964  Zagar et al. ................. 277/80 UX Primary Examiner—Samuel B. Rothberg
Attorney—Wolf, Greenfield & Sacks ABSTRACT: An improved hermetic seal between an enclosure and a shaft which projects and passes through the enclosure into the chamber within. The seal isolates the internal chamber from the ambient environment when the chamber and environment are at different pressure levels, as when the chamber is maintained at vacuum conditions. Additionally, the construction of the seal permits the shaft to be rotated at high speeds with a moderate amount of flexure while maintaining an effective seal. The shaft which is ferromagnetic, passes through an enlarged opening in the housing. One end of a bellows is secured to the exterior housing about the opening and surrounds a portion of the shaft. The other end of the bellows is sealed and secured to a permanent ring magnet which surrounds the shaft and which has annular pole elements spaced axially along the shaft, each pole element surrounding the shaft completely. The pressure seal is effected by a volume of magnetic fluid associated with each pole piece, each volume of fluid being disposed annularly around the shaft in the region of the pole pieces. The magnetic fluid bridges the annular gaps between the pole pieces and the shaft, the magnetic pole pieces and associated regions of the shaft being contacted intimately in sealed relation by the magnetic fluid and being maintained in this configuration by the magnetic pole pieces.

PATENTED OCT 12 1971 3,612,549
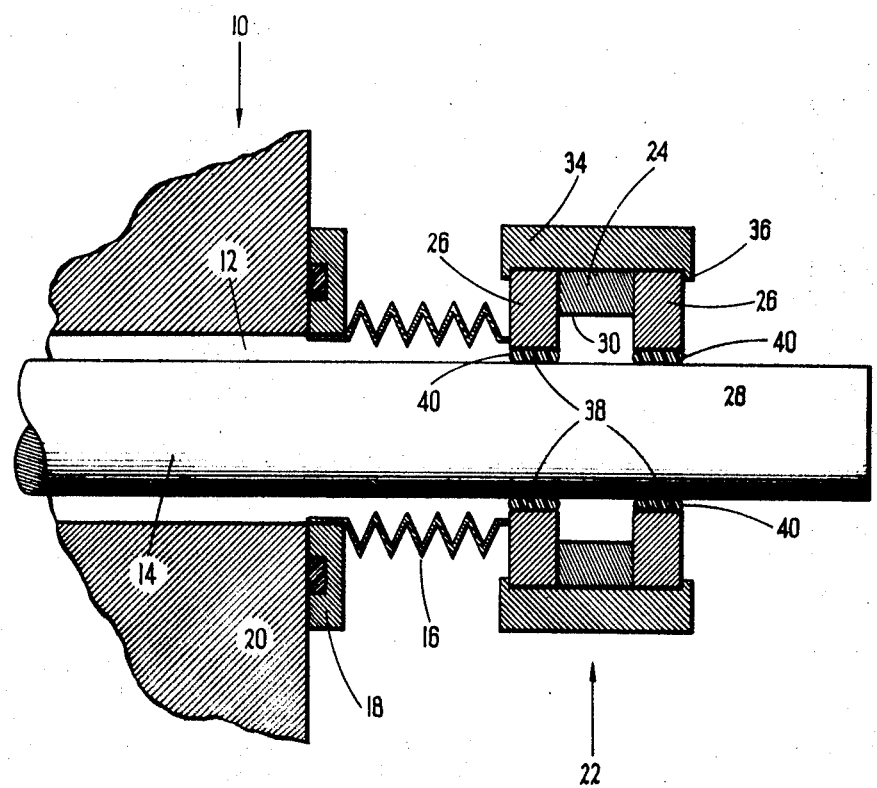
INVENTOR
Melvin H. Berkowitz
BY
Wolf, Greenfield & Sacks

PRESSURE SEAL

BACKGROUND OF THE INVENTION

This invention relates to an arrangement for sealing a shaft, as that of a motor, to an enclosure or housing in which the interior chamber within the housing is maintained at a different pressure than that of the external environment, as when the chamber is maintained at vacuum conditions. Seals of the type described may be employed in wide variety of environments processes, or devices which require the insertion or manipulation of the shaft through a housing to perform various operation in an isolated or vacuum environment. Considerable difficulty, however, has been encountered in providing effective seals in vacuum technology. In attempt to achieve a satisfactory seal, a number of techniques have been proposed and employed in the prior art to maintain the desired pressure differential conditions and to isolate the chamber from external contaminants and other possibly adverse characteristics of the ambient environment. Many of the prior seals, however, present a number of difficulties both in construction and operation. For example, in the most common arrangements, the shaft is journaled to the housing for a bearing supported by the housing in close surface-to-surface contact. These seals may require lubrication and particles of the lubricant may pass into the chamber. When the chamber is maintained at vacuum conditions, entry of some of the lubricant particles into the chamber may contaminate the vacuum, which may have an adverse effect on the process being performed within the vacuum chamber. Additionally, the shaft and its receptive bearing must be machined to an extremely fine tolerance which increases the cost of fabrication. Furthermore, seals formed by a surface-to-surface contact may overheat and will tend to wear quickly thus reducing the effectiveness of the seal. These seals do not permit the position of the shaft to be adjusted readily if such adjustment is desired. The alignment of the shaft with the bearing surface is critical to the effectiveness of the seal. Still other seals have been employed with not altogether satisfactory results such as hydrodynamic seals and clearance seals. These seals are not well suited for me in most vacuum applications.

My invention overcomes a number of the difficulties encountered with prior devices in that it is of simple construction, is substantially wear-free, is not critical as to the alignment of the shaft with its associated bearing surface is well suited for me in vacuum technology. Additionally, the sealing arrangement of the invention permits the shaft to be rotated at high speeds and also permits shaft flexure to a degree which is considerably greater than has been achieved heretofore in vacuum seals. These advantages are achieved by employing a magnetic fluid seal about the shaft in which the fluid surrounds the shaft fully and in intimate contact with the shaft. The fluid seal is connected to the housing to be sealed by a connector which extends from the housing to locate outwardly of the housing.

SUMMARY OF THE INVENTION

In accordance with the invention, the seal is formed by a fluid having magnetic properties which is maintained in intimate sealing contact in ring or annulus about the shaft by a ring magnet which surrounds the shaft. The fluid bridges the annular gap between the magnet and the shaft and completes the magnetic circuit. The magnet is secured hermetically and in substantial coaxial alignment to the outer end of a bellows or the other connecting element which, in turn, is sealed hermetically in axial alignment to the end of the bell of the vacuum housing. The shaft passes centrally through the magnet, bellows, and into the vacuum chamber the seal being effected in the outer region of the bellows. The clearance between these parts and the shaft are relatively large which enables manufacturing tolerances to be relaxed substantially and also enables the shaft position to be adjusted somewhat, if desired.

Thus, it is among the primary objects of the invention to provide a seal between a shaft and a housing which permits the shaft to be rotated at relatively high speeds and which permits a considerable degree of shaft flexure without damaging or interrupting the seal.

Also, among the primary objects of my invention is to provide a pressure differential seal between a shaft and a housing which avoids any surface-to-surface frictional contact between the sealed parts.

A further object of the invention is to provide a seal which is substantially wear-free and generates little or no heat.

Another object of the invention is to provide a seal which avoids the use of any lubricates which might contaminate the interior of the chamber.

Another object of the invention is to provide a seal which does not require extremely close manufacturing tolerances between the part to be sealed and enables limited adjustment of shaft position.

Still another object of the invention is to provide a seal which may be repaired, if necessary, simply be adding the necessary quantity magnetic sealant fluid.

DESCRIPTION OF THE PREFERRED EMBODIMENTS

The above and other objects and advantages of the invention will be understood more fully with reference to the following detailed description and the accompanying drawing which shows the housing, shaft and seal partly in section.

As shown in the drawing, the housing 10, which defines the vacuum chamber has an opening 12 formed therein through which the shaft 14 projects into the chamber. The opening 12 preferably is considerably larger than the diameter of the shaft which avoids the necessity for fine manufacturing tolerances and also permits the position of the shaft 14 to be adjusted somewhat, if desired. The external end (to the right as seen in the drawing) of the shaft 14 may be connected to a motor or other device adapted to impart the desired motion to the shaft, depending on the particular device with which the seal is used.

The sealing arrangement also includes an enclosure or connector such as the bellows 16, which is secured hermetically to the exterior of the housing 10, as by the ring 18. The ring 18, in turn, may be secured to the housing and sealed by an O-ring 20. The bellows preferably is fabricated from a metallic material, although other materials suitable for effecting an hermetic seal may be employed. The bellows receives the shaft 14 and is disposed about and in general axial alignment with the shaft 14.

A sealing unit, indicated generally by the reference character 22 is secured hermetically to the outer end of the bellows 16 and surrounds the shaft 14 in a manner which provides an effective seal about the shaft. The sealing unit 22 includes a permanent ring magnet 24 and one or more ferromagnetic ringlike pole pieces 26. In the illustrative embodiment, a pair of pole pieces are employed and are located at opposite surfaces of the permanent ring magnet 24. The inner diameter of the central holes 28 in the pole pieces 26 is smaller than the inner diameter of the central hole 30 through the ring magnet 24 so that the pole pieces 26 are located closer to the magnetically permeable shaft than the magnet 24 itself. This is effective to increase the flux density in the gap between the pole pieces and the shaft 14. The magnet and pole pieces 24, 26 preferably are surrounded by a nonmagnetic housing 34 having radially inwardly directed flanges 36 which bind the magnet 24 and pole pieces 26 together and insure their proper alignment.

The diameter of the central holes 28 and the pole pieces 26 is considerably grater than the diameter of the shaft 14 or at least provide considerably greater clearance than prior sealing arrangements. This avoids the necessity for manufacturing the parts in the region of the seal to close tolerances with its attendant, economic, as well as manufacturing difficulties.

The gaps 38 defined between the inner edges of the central holes 28 and the pole pieces 26 and the shaft 14 are filled with a magnetic fluid which assumes an annular ring about the shaft and which is maintained in intimate sealing contact with the pole pieces 26 and their associated segments for regions of the shaft 14. The magnetic fluid is maintained in the annular sealing configuration about the shaft 14 at all times by the magnetic flux within the annular gap 38 thus providing a seal at all times, even when the shaft 14 is rotated at high speeds. Because the annular magnetic fluid ring 40 conforms to the contour of the shaft 14 and its associated pole pieces 26, an irregularity in the shaft will have no effect on the sealing characteristics of the annular magnetic fluid rings 40 which conform intimately to the contour of the shaft 14 at all times.

The particular composition of the magnetic liquid may vary in accordance with the design parameters of the seal and the particular use and environment in which the seal is to be employed. A variety of magnetic fluids of varying characteristics are available commercially.

In the preferred embodiment shown in the drawing, the radial or longitudinal orientation of the shaft 14 may be adjusted slightly in relation to the sealing unit 22 and housing 10 by means of the bellows 16 which may move or flex readily to accommodate such movement. An hermetic seal is insured at all times because of the continual engagement or contact of the liquid rings 40 with the shaft 14. The bellows 16 also reduces the likelihood of damage to the seal as a result of inadvertent shock or stress. Of primary importance is the capability of the seal which permits limited flexure of the shaft which flexure does not impair the effectiveness of or destroy the seal in any way. Such shaft flexure may be intentional or may be the result of rotating the shaft at high speeds.

Although, in the preferred embodiment shown, it is desirable to provide more than one magnetic fluid ring 40. The invention may be practiced with only one such ring, provided that the pressure differentials encountered are across the ring 40 are not excessive and will not tend to break through the ring 40 and thus destroy the seal even temporarily.

Furthermore, the illustrative embodiment has been described as requiring the use of a magnetically permeable shaft 14 to complete the magnetic circuit. In some instances, it may be desirable to employ a nonmagnetic shaft. In this case the fluid ring 40 may be maintained in sealing intimate relation about the shaft 14 by locating the inner peripheral margins of the pole pieces 26 in close proximity to each other so that the gap between the pole pieces will be filled by the magnetic fluid. The pole pieces are located closely to the shaft so that they may support the liquid magnetic ring about and in intimate sealing contact with the shaft even though the shaft itself does not carry any of the magnetic flux.

Thus, I have disclosed an improved sealing device to seal a shaft to a housing hermetically yet which permits limited shaft movement both longitudinally and radially, if desired and which is suited particularly for use in vacuum technology. The flexible connection between the sealing unit and the housing also eliminates the necessity for critical alignment of the shaft and its sealing bearing as has been necessary in prior devices. Additionally, the device is substantially wear-free, may be adapted and fitted to existing units, is of simple design and may be fabricated simply and inexpensively.

It should be understood that, however, the foregoing description of the invention is intended merely to be illustrative thereof and that other embodiments and modifications will be apparent to those skilled in the art without departing from its spirit.

Having described the invention, what is claimed is:

1. In a housing having an opening formed therein and a shaft extending through said opening and into said housing, an improved hermetic seal therebetween comprising:

a connector secured at one end in sealed relation to the exterior of said housing and about said opening, said connector being of hollow construction and in communication with said opening, said shaft passing through said connector; and a sealing unit secured hermetically to the other end of said connector, said sealing unit including annular magnet means surrounding said shaft and defining an annular gap between said magnet means and said shaft, and a magnetic liquid disposed within said annular gap in intimate sealing contact with said shaft and said magnet means to provide an hermetic seal across said gap, and moveable means constructing said connector to enable adjustment of the orientation and movement of said shaft and sealing unit.

2. An apparatus as defined in claim 1 wherein said connector is of flexible construction.

3. An apparatus as defined in claim 2 wherein said connector is of a bellows configuration.

4. An apparatus as defined in claim 1 wherein said shaft is magnetically permeable and wherein the magnetic field passes through said magnet, said magnetic liquid and said shaft.

5. An apparatus as defined in claim 1 wherein said shaft is nonmagnetic and wherein said magnet means comprises;

a pair of annular pole pieces surrounding said shaft and having inner peripheral margins located in proximity to each other and to said shaft, said magnetic liquid being retained magnetically in an annular configuration between said inner margins of said pole pieces and in intimate contact continuously of said shaft.